Figure 1:
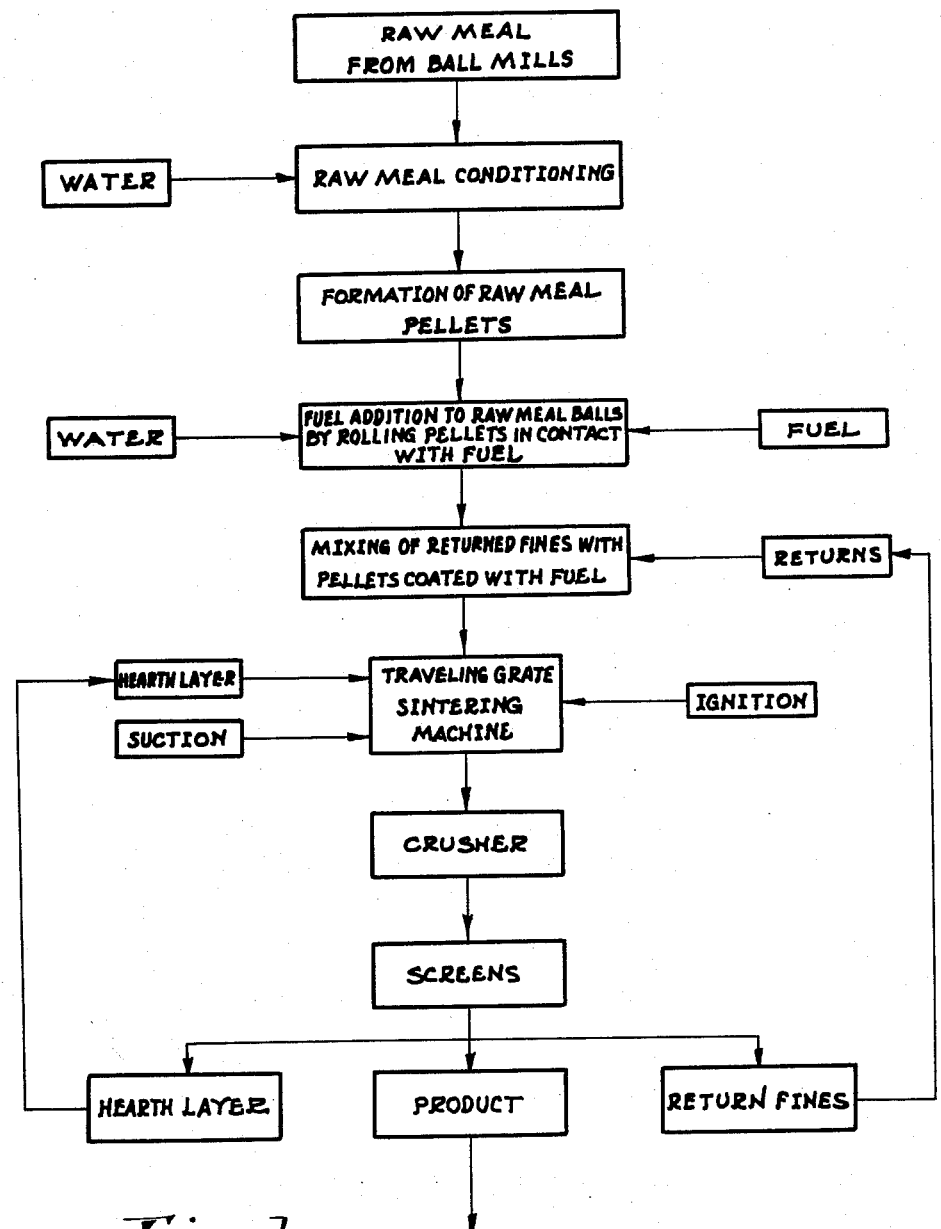

Dec. 17, 1963 J. E. REA 3,114,648
PROCESS FOR THE PRODUCTION OF HYDRAULIC CEMENT
Filed Sept. 8, 1961 2 Sheets-Sheet 1

INVENTOR.
JAMES E. REA.
BY Ronald S. Cornell.
his ATTORNEY

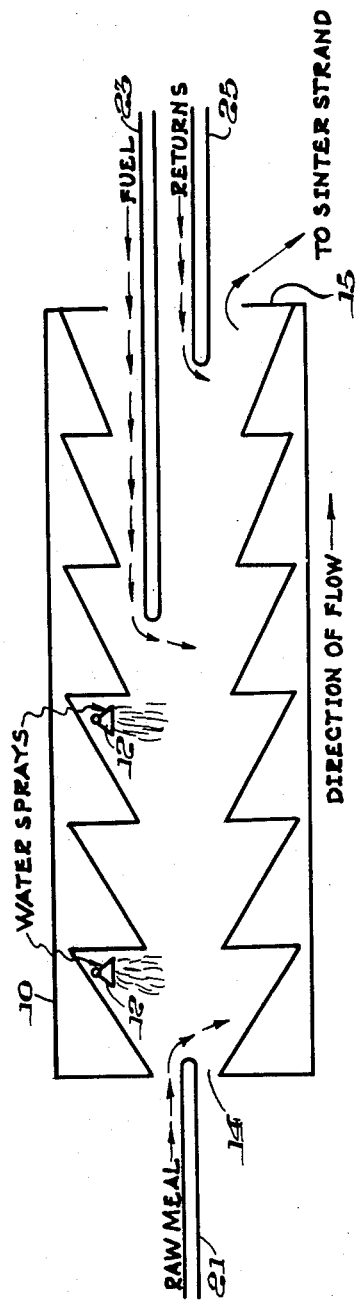

United States Patent Office 3,114,648
Patented Dec. 17, 1963

3,114,648
PROCESS FOR THE PRODUCTION OF
HYDRAULIC CEMENT
James E. Rea, Pittsburgh, Pa., assignor to Koppers
Company, Inc., a corporation of Delaware
Filed Sept. 8, 1961, Ser. No. 136,799
6 Claims. (Cl. 106—101)

This invention relates generally to a process for the production of cement that has a light color and more particularly to a process for forming a composition that will yield a cement having no objectionable coloration.

To obtain a cement that does not have objectionable coloration, it has been necessary heretofore to produce the cement in a rotary kiln. Heretofore the raw calcareous material had been fed to a rotary kiln which converts this raw material into cement clinker. Such raw material is generally referred to in the art as "raw meal."

In accordance with this invention, a novel composition is made which yields a cement having a light color without the use of a rotary kiln.

Heretofore in the preparation of cement from raw meal the raw meal has been exposed in the kiln to hot gases which are usually generated by burning pulverized coal although in some instances, oil or natural gas is used. The hot gases evaporate the moisture, drive off carbon dioxide and fuse the material into clinker. The clinker is then ground to the finished cement.

The commercial specifications for cement are stringent. The A.S.T.M. specifications for Type I Portland cement, for example, are as follows:

|  | Maximum percent |
|---|---|
| MgO | 5 |
| $SO_3$ | [1] 2.5 |
| L.O.I. | 3.0 |
| Insoluble residue | 0.75 |

[1] 3.0 if $3CaO.Al_2O_3$=over 8%.

The above specifications are for the finished product which would include all additives, e.g., gypsum. In addition to the above requirements, a quality product which is competitive must meet certain other chemical requirements.

Tricalcium silicate should be about 55 or 56%, dicalcium silicate should be about 20%. Tricalcium aluminate should not be over 12% and tetracalcium aluminoferrite should be about 10%. Furthermore, free lime should be less than 1% and sulphur (or sulfides) should be kept to a minimum. Free carbon in the clinker is most objectionable due to the dark color it imparts to the finished cement.

While the product of the rotary kiln is physically and mechanically acceptable, it is well known that the rotary kiln is not as economical as a traveling grate sintering machine either in capital or production costs.

The rotary kiln process usually requires at least three hours. These same reactions may be accomplished in a much shorter period of time (10-15 minutes) on a traveling grate sintering machine.

However, methods of producing clinker on traveling grate sintering machines, as heretofore known, do not produce a clinker which is acceptable to the industry primarily due to the presence of residual carbon in the product. Even small traces of carbon impart a dark coloring to the finished cement.

Exhaustive work has been carried out to find a method for eliminating all traces of carbon in the sintered clinker. Various ratios of raw meal/return fines/fuel were tried. Different types of fuels were investigated, bed depth has been varied and new mixing techniques have been introduced. Heretofore, no solution had been found to the problem of eliminating carbon in the clinker.

In a typical clinker of the prior art which has been formed on a traveling grate, the sulphur content is generally too high and the insoluble residue is also above the tolerable amount.

An object of the present invention, therefore, is to provide a process for the production of cement on a traveling grate by a series of steps for pelletizing raw meal, returned sinter material and fuel to provide a commercially acceptable cement which has no objectionable color and which meets the A.S.T.M. specifications.

Another object of the invention is to provide for the maximum possible permeability of the mixture at the sintering machine.

This invention contemplates a process whereby the sulphur and the insoluble residue content of the sinter is considerably reduced and achieves this result by pelletizing raw meal, fuel and return fines in a specific manner.

In the operation of my process, the various ingredients of the cement making composition are introduced into a pelletizer in a critical sequence. It has been found that the raw meal must first be pelletized before the fuel or return fines are added to the pelletizer. The fuel is added to the raw meal after pellets have been formed. This causes the fuel to coat the the surface of the raw meal pellets whereby all of the fuel is in close proximity to the raw meal. After the fuel has been thus coated upon the raw meal pellets, the return fines are added and the pelletizing process is completed.

The addition of the return fines after the fuel and raw material has been pelletized provides for the maximum permeability of the mixture at the sintering machine, it serves to lower the moisture content of the entire mix, and the sulphur content of the clinker is considerably reduced.

In carrying out the invention, only a relatively small amount of water is necessary. This is advantageous because it results in a superior product, and requires less heat in the sintering step.

The manner in which the specific series of additions serve to achieve the above mentioned desirable properties is not known. However, it is believed that the reduction in the sulphur content of the clinker is related to the added permeability derived by adding the return fines after the fuel and raw meal have been pelletized.

It is also believed that the presence of free carbon in the sintered cement clinker is due to incomplete burning of the fuel and that this incomplete burning is obviated by the increased permeability and by the fact that the fuel is coated upon the outside of the raw meal.

It has been proposed heretofore to add the fuel after the raw meal has been pelletized, but in this proposal, the return fines were mixed with the raw meal. This proposed method was inadequate in that the sintered cement clinker still contained free carbon and sulphur above the maximum permissible amount. It is only by coating the raw meal pellets with the fuel and adding the return fines as the last ingredient into the mix that an acceptable cement clinker is formed.

Other objects and advantages of the invention will be apparent from the following description when taken in connection with the accompanying drawings which diagrammatically illustrate the best mode contemplated of carrying out the present invention.

In the drawings:

FIGURE 1 is a flow sheet showing the steps of the process, and

FIGURE 2 diagrammatically illustrates a pelletizer and the manner in which ingredients may be fed thereto.

The mixing and pelletizing process may be readily performed with presently available equipment; for example, three disc pelletizers or three drum pelletizers in series may be used. However, the Koppers-Stirling multiple cone drum pelletizer (United States Patent No. 2,920,344) is particularly adapted to the mixing sequence in that it is possible to confine the entire mixing and pelletizing process to one piece of equipment. Water additions may also be made if necessary during the pelletizing operation in this drum.

Any commercially available traveling grate sintering machine may be used in carrying out my process. By way of example, there may be used an endless pallet sintering machine such as that disclosed in expired U.S. Patent No. 2,090,363 issued to H. Wendeborn, or that shown in U.S. Patent No. 2,848,214 issued to Wilfred C. Schofield on August 19, 1958.

FIGURE 2 diagrammatically illustrates a modified Kopper-Stirling multiple cone drum pelletizer. In this drawing, 21 denotes a feed means, such as an endless belt conveyor, for the raw meal. The raw meal is fed to the inlet 14 of drum 10 where it is pelletized. After the raw meal has been pelletized, fuel is added by feed means such as an endless belt conveyor 23. Adjacent the outlet 15 of the pelletizer 10, there is located an additional feed means 25 for the return fines. The pelletized mixture is removed from the discharge end 15 of the pelletizer and deliver to a traveling grate sintering machine now shown. Water sprays, such as those shown at 12, may be used to inject water into the pelletizer if necessary.

In operation, raw meal from ball mills is delivered to a raw meal conditioning device wherein water is added. The wet raw meal is formed into raw meal pellets at the front end of pelletizer 10. In the pelletizer, additional water may be added if necessary through water sprays 12. Fuel, preferably of a size that will pass through a ⅛" screen, is added to the pelletizer intermediate the ends thereof. Near the exit end of the pelletizer 10, return fines are mixed with the fuel coated pellets. The returns generally will pass through a ⅜" screen. The mixture from the pelletizer is then delivered to a traveling grate sintering machine where it is placed on top of a hearth layer. The mixture is ignited and suction on the order of 12–30 inches of $H_2O$ column is drawn upon the traveling grate whereby sufficient heat is evolved to remove the moisture, calcine the material (i.e., drive off $CO_2$) and fuse the material and whereby clinker is formed. The sintered clinker is then passed to a crusher where it is ground. The crushed material is passed to screens which size the material into product, which is retained on a ¾" screen; hearth layer, which passes through a ¾" screen and is retained by a ⅜" screen; and return fines, which pass through a ⅜" screen. The return fines are recycled to the pelletizer and the hearth layer is recycled to the traveling grate.

It has been found that in using the foregoing new sequence of steps for pelletizing the mixture, the moisture content, fuel content, return fines to raw meal ratio, suction and depth of bed may be varied within reasonable limits and still produce acceptable clinker.

The use of the novel mixing and pelletizing process of the invention permits the alteration of other features of the sintering process for the benefit of sintering rate and more economical operation without affecting the carbon free characteristic of the sintered clinker.

The following example is illustrative of the process. It should be understood that the example is not intended to be a definition of the invention but is for the purpose of illustration only.

*Example I*

Raw meal consisting of:

| | Percent |
|---|---|
| Limestone | 72.0 |
| Blast furnace slag | 22.5 |
| Sand | 5.0 |
| Open hearth treater dust | 0.5 | was delivered to a conditioning device to which a small amount of water was added. An analysis of the raw meal was as follows:

| | Percent |
|---|---|
| $SiO_2$ | 14.6 |
| $Al_2O_3$ | 3.8 |
| $Fe_2O_3$ | 1.7 |
| CaO | 49.6 |
| Loss on ignition | 27.7 |

A screening of the raw feed showed 80% passing a No. 200 M sieve.

The wet raw meal was formed into raw meal pellets in a Koppers-Stirling multiple cone drum pelletizer with the aid of an additional small quantity of water. At about the center of the pelletizer, coke breeze was introduced. Near the exit end of the pelletizer, return fines were added. The weight ratio of raw meal to fuel to return fines was 50.0% to 8.0% to 42.0% respectively, and water was 9% of the total weight.

The resultant mixture was delivered to a conventional traveling grate sintering machine and sintered. The sintered clinker was then crushed and screen. The crushed material which was retained on a ¾" screen was then ground together with gypsum until the product had a surface area of approximately 1700 square centimeters per gram as measured by a Wagner turbidimeter. The cement product passed A.S.T.M. specifications, had no objectionable color, and was of high commercial quality.

As a comparison between the process of this invention and the traveling grate sintering process as heretofore known, raw meal identical to that of Example I was mixed with coke breeze and return fines and then pelletized in a Koppers-Stirling multiple cone drum pelletizer with the addition of water to give a water content of 9%. The weight ratio of raw meal to fuel to return fines was 50.0% to 8.0% to 42.0%. The resulting pellets were delivered to a conventional traveling grate sintering machine and sintered under the same conditions used in Example I.

The sintered clinker was crushed and screen. That part of the crushed material which was retained on a ¾" screen was then ground together with gypsum until the product had a surface area of approximately 1700 square centimeters per gram.

The product was objectionable in that it had a dark gray color. The sulphur content of the cement was above the maximum commercially acceptable amount as was the insoluble residue content.

As a further comparison, raw meal identical to that of Example I was mixed with return fines and formed into pellets, the fuel was added as a final ingredient and the pelletizing was completed. The pellets were sintered under identical conditions as Example I. The cement product which was produced this time was dark gray and the insoluble residue and sulphur contents were too high to be commercially acceptable.

In the practice of the instant invention, the important steps are the pelletizing of the raw meal, then introducing fuel to the pelletizer whereby the fuel coats the surface of the raw meal pellets and, as a last step, introducing return fines into the pelletizer. Other parameters of the process may be varied; for example, the raw meal may constitute from about 30 to about 80% by weight of the dry mix; the fuel content may be from about 5 to about 25%; the return fines may vary from about 15 to about 60%; and water content from 7 to 11% based upon the total weight of the dry mix is permissible. The operable weight ratios of raw meal to fuel and raw meal to return fines may vary within the limits of raw meal:fuel—from 1.0:0.06 to 1.0:0.83 and raw meal:return fines—from 1.0:0.18 to 1.0:2.0.

A number of materials may be used as fuel. Generally the fuel is coke in the form of coke breeze. Other materials such as carbon black, coal or anthracite dust are operable. It has been found that a high grade white cement may be produced if petroleum coke is used as the fuel.

Various modifications may be made without departing from the nature of my invention which is intended to be limted only by the appended claims.

I claim:

1. A process for producing a composition that will make a cement having no objectionable color which consists essentially of forming pellets of raw meal, adding fuel to the surface of said pellets, thereafter adding returned fines to said pellets and further mixing to produce a mixture of pellets and returned fines, which mixture is capable of being ignited to produce a sinter product that will make cement having no objectionable color.

2. The process of claim 1 wherein said fuel is petroleum coke and wherein said mixture is capable of being sintered to produce a high grade white cement.

3. The process of producing a commercially acceptable light colored cement clinker which consists essentially of pelletizing raw meal to form pellets, adding fuel to the surface of said pellets and continuing said pelletizing whereby the surface of the pellets is coated with fuel, adding return fines to the coated pellets, further pelletizing the resulting mixture, placing said mixture on a grate, and igniting said mixture to produce a sintered product.

4. A process for producing cement clinker on a traveling grate which consists essentially of introducing raw meal into a pelletizer, partially pelletizing said raw meal, introducing coke breeze into said pelletizer and continuing said pelletizing operation, then introducing return fines into said pelletizer while continuing said pelletizing, removing the resulting mixture from said pelletizer, forming a layer of said mixture on a traveling grate, igniting said layer, subjecting the ignited layer to an oxidizing blast to form a sintered clinker, crushing said sintered clinker to form a coarse portion, fines and intermediate size particles, returning said fines to said pelletizer and returning said intermediate size particles to said traveling grate to be used as a hearth layer thereon, and using the said coarse portion of said clinker for the production of cement.

5. A process for producing light colored Portland type cement clinker which consists essentially of pelletizing about 1 part by weight of raw meal to form raw meal pellets, adding from about 0.06 to about 0.83 part by weight of fuel to said partially pelletized raw meal and continuing the pelletizing whereby said fuel coats the surface of said raw meal pellets, adding from about 0.18 to about 2.0 parts by weight of return fines to said fuel coated raw meal pellets, forming a layer of the resulting mixture on a grate, igniting said layer and sintering said mixture whereby cement clinker is formed.

6. A process for making cement that has no objectionable color which consists essentially of:
 (a) forming pellets of raw meal;
 (b) coating said pellets with coke breeze;
 (c) thereafter mixing said coated pellets with fine cement clinker; and
 (d) sintering said mixture to produce more cement clinker.

References Cited in the file of this patent

UNITED STATES PATENTS 1,073,820     Richards et al. _____ Sept. 23, 1913

FOREIGN PATENTS 445,164     Great Britain _____ Apr. 3, 1936